United States Patent [19]

Watts

[11] 4,252,170

[45] Feb. 24, 1981

[54] SAFETY SUPPORT FOR PNEUMATIC TIRES

[75] Inventor: George T. Watts, North Canton, Ohio

[73] Assignee: The Goodyear Tire & Rubber Company, Akron, Ohio

[21] Appl. No.: 892,763

[22] Filed: Apr. 3, 1978

[51] Int. Cl.³ ............................................. B60C 17/04
[52] U.S. Cl. ............................................. 152/330 RF
[58] Field of Search ............ 152/158, 330 RF, 330 L; 403/58, 164

[56] References Cited

U.S. PATENT DOCUMENTS

| | | | |
|---|---|---|---|
| 3,420,288 | 1/1969 | Unruh | 152/158 |
| 3,976,114 | 8/1976 | Patecell | 152/158 |
| 3,981,341 | 9/1976 | Bauer et al. | 152/158 |
| 3,990,491 | 11/1976 | Hampshire et al. | 152/158 |

FOREIGN PATENT DOCUMENTS 1228356   4/1971   United Kingdom ...................... 403/58

Primary Examiner—Robert B. Reeves
Assistant Examiner—Gene A. Church
Attorney, Agent, or Firm—J. A. Rozmajzl; Frederick K. Lacher

[57] ABSTRACT

A segmental annular safety support having swivel hinged segments for mounting on a rim inside a tire chamber with at least one of said segments having resilient means at the inner periphery for compression between the rim and segment when the segments are latched together to provide preloaded clamping of the support on the rim.

6 Claims, 8 Drawing Figures

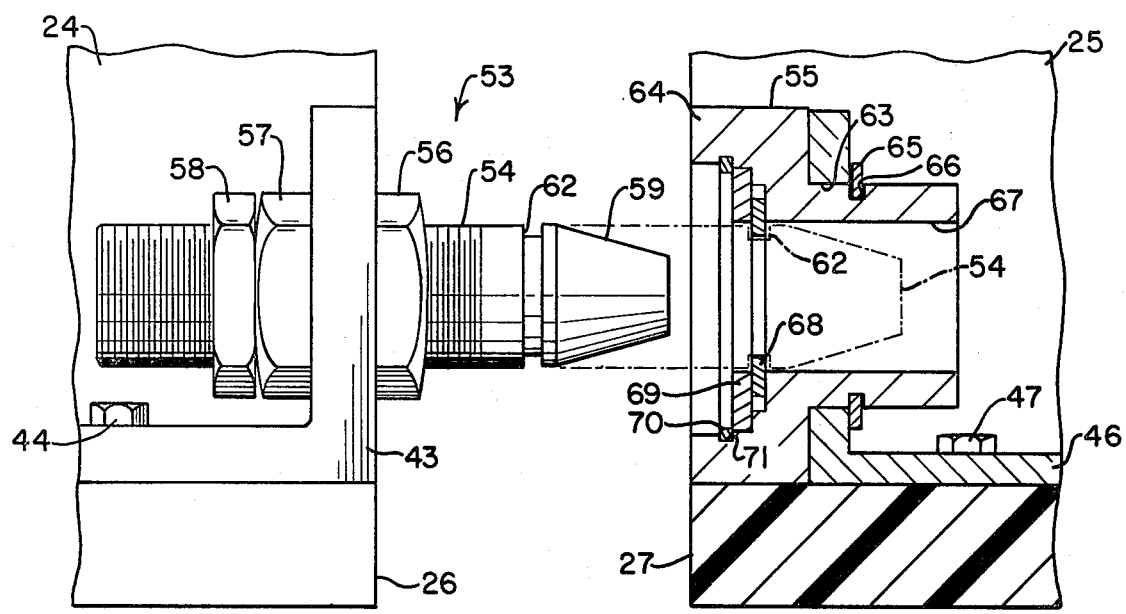
FIG.-5
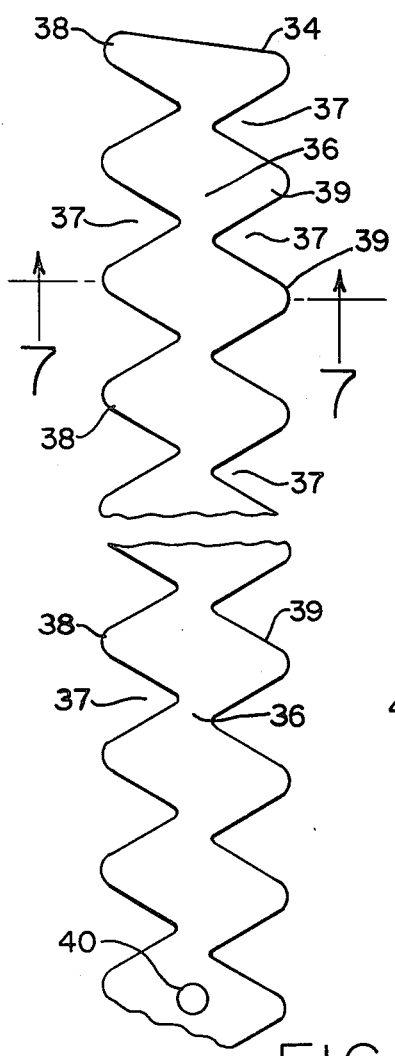
FIG.-6
FIG.-7
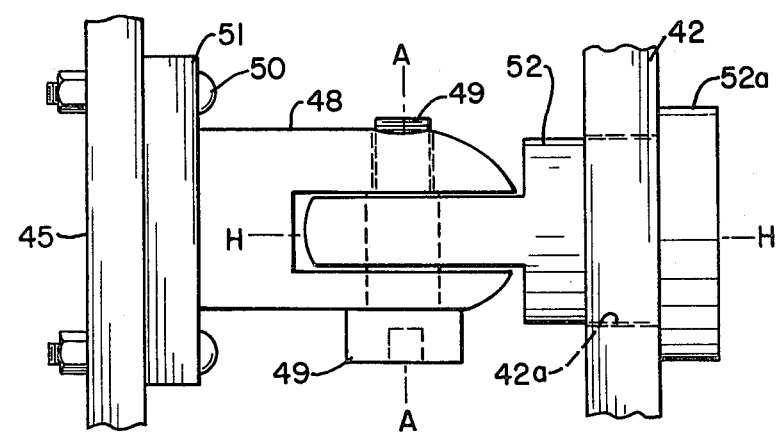
FIG.-8

SAFETY SUPPORT FOR PNEUMATIC TIRES

This invention relates generally, as indicated, to a segmental safety support for use on a wheel rim inside a tire chamber to support the tire in a deflated condition.

Heretofore segmental safety supports have been mounted on rims by bolting the segments together or where the segments are hinged a cam latch has been used to clamp the segments together. One of the problems with safety supports mounted on rims is the rotation of the safety support relative to the rim when the support is in torque-transmitting engagement with the tire. This relative rotation of the support on the rim generates heat and causes substantial wear which results in premature failure of the safety support.

Another problem has been the rotation of the safety support on the rim when the tire is operated in the inflated condition at high speeds. This rotation has resulted from the centrifugal forces acting on the safety support segments pulling them away from the rim. The relative rotation of the safety support has adversely affected the wheel balance and ride of the vehicle at high speeds which is objectionable.

To overcome these problems brackets on the segments have been bolted together with the bolts being subjected to substantial tension on the order of around 10,000 pounds. This has clamped the safety support to the rim with sufficient force to prevent relative rotation but the process of mounting the support on the rim while the support is located within the tire chamber has required more assembly time and equipment than is desirable especially for automobile assembly lines.

Where the safety support has been clamped on the rim after the tire is mounted no provision has been made to provide a preloaded clamping force against the rim which will prevent rotation of the safety support relative to the rim. Furthermore it has not been possible to apply this clamping force with bolts and nuts because no direct access to the safety support is possible after the tire is mounted on the rim. It is also important that the clamping force be a predetermined amount for different applications and this has not been possible with prior constructions where the support is within the tire chamber and the tire is mounted on the rim.

With the foregoing in mind it is the principal object of this invention to provide a segmental safety support with resilient means for engagement with a rim surface for preloaded clamping of the support on the rim.

Another object is to provide for connecting the segments together at a predetermined position by an adjustable latch for obtaining the desired preloaded clamping on the rim.

A further object is to provide a resilient member at the inner periphery of the support for resilient engagement with a rim surface.

A still further object is to provide a wheel rim, pneumatic tire and safety support with a resilient member between the rim and safety support for preloaded clamping of the safety support on the rim.

Another object is to provide a rim construction for simultaneous mounting of both beads and the safety support on the rim.

A further object is to provide a construction for swiveling the segments and positioning the safety support in a predetermined location in the wheel well.

These and other objects of the invention are provided by a segmental annular safety support having swivel hinged segments and a resilient member at the inner periphery for engagement with the rim. The segments are adapted to be pushed toward a rim surface to compress the resilient member and a latch holds the segments together to provide preloaded clamping of the rim by the safety support.

To the accomplishment of the foregoing and related ends, this invention, then, comprises the features hereinafter fully described and particularly pointed out in the claims, the following description and the annexed drawings setting forth in detail an illustrative embodiment of the invention, this being indicative, however, of but one of the various ways in which the principles of the invention may be employed.

In the annexed drawings:

FIG. 5 is an enlarged fragmentary view, partly in section, showing the pin and socket latch with the pin shown in dot-dash lines within the socket in the latched condition.

FIG. 6 is a plan view on an enlarged scale of a spring which may be fastened to the inner periphery of the segments, parts being broken away.

FIG. 7 is a sectional view of the spring taken along the plane of line 7—7 in FIG. 6.

FIG. 8 is a fragmentary view of the hinge taken along the plane of line 8—8 in FIG. 4.

Figure 1:
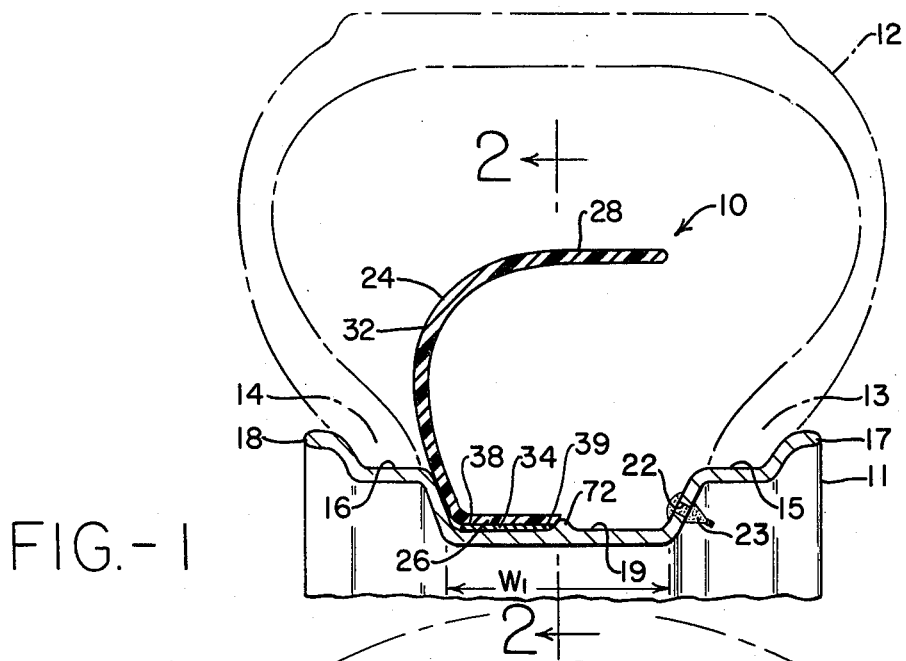
FIG. 1 is a cross-sectional view taken along the plane of line 1—1 in FIG. 2 of a segmental safety support embodying the invention mounted on a wheel rim with the tire being shown in phantom lines and the connection of the rim to the supporting wheel not being shown.
Figure 2:
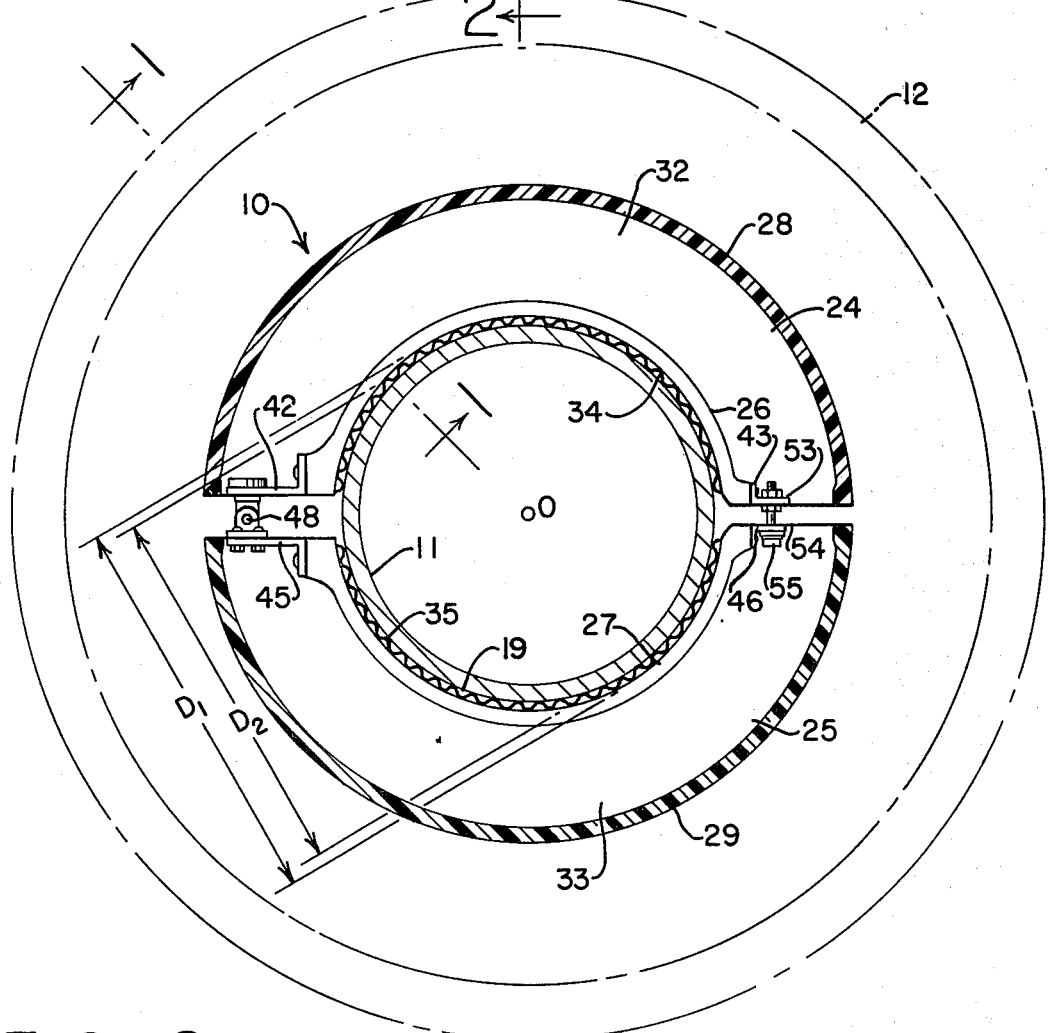
FIG. 2 is a sectional view taken along the plane of line 2—2 of FIG. 1 of the safety support mounted on the rim within the tire which is shown in phantom lines.

Referring to FIGS. 1 and 2, an annular segmental safety support 10 is shown mounted on an annular rim 11. The rim 11 is part of a wheel of a type well known in the art but not shown in this drawing. A pneumatic tire 12, shown in phantom lines, is mounted on the rim 11 and has a first bead portion 13 at one edge and a second bead portion 14 at the other edge.

The rim 11 has bead seats 15 and 16 for mounting of the bead portions 13 and 14, respectively, with the bead seat 15 having a side flange 17 and the bead seat 16 having a side flange 18. A circumferentially extending wheel well 19 is provided in the rim 11 between the bead seats 15 and 16. The rim 11 may have an opening 22 in the wheel well 19 for receiving a valve 23 for inflating and deflating the tire 12. The tire 12 is of a type which is inflatable without a tube and may be of a radial, bias-belted or bias ply construction.

The safety support 10 is an annular body divided into generally semicircular arcuate segments 24 and 25, each being made of a single unitary piece preferably of a material such as fiberglass-reinforced plastic. The segments 24 and 25 have a generally C-shaped cross section, as shown in FIG. 1, with inner rim-supported portions 26 and 27 at the inner periphery of the segments 24 and 25, respectively. Tire tread-supporting portions 28 and 29 are provided at the outer periphery of the segments 24 and 25, respectively. The inner rim-supported portions 26, 27 and tire tread-supporting portions 28, 29 are connected by curved intermediate portions 32 and 33, respectively.

Referring to FIGS. 1 and 2, elongated resilient members such as wave springs 34 and 35 are mounted between the outer surface of the wheel well 19 and the inner surfaces of the inner rim-supported portions 26 and 27. The wave springs 34 and 35 may be identical and the following description of wave spring 34 will also apply to wave spring 35. Referring to FIGS. 6 and 7, the wave spring 34 is an elongated strip of steel or other suitable resilient material having a central portion 36 extending longitudinally of the spring with openings 37 at spaced-apart positions along each edge to provide spring fingers 38 along one edge and spring fingers 39 along the opposite edge. Alternate pairs of spring fingers 38 and 39 are bent upwardly and downwardly as shown in FIG. 7 for engagement with the surface of the inner rim-supported portion 26 and the outer surface of the wheel well 19. A hole 40 may be provided in the wave spring 34 for receiving a screw (not shown) threaded in a hole in the inner rim-supported portion 26 of the segment 24 to retain the wave spring in position during assembly and disassembly. The dimensions of the wave springs 34 and 35 and the material of which they are made may be selected to produce the compression forces desired upon clamping of the segments 24 and 25 against the rim 11, as shown in FIG. 2.

Brackets 42 and 43 are mounted on the inner rim-supported portion 26 of the segment 24 at the ends by screws 44 or other suitable fastening means. Brackets 45 and 46 are mounted on the inner rim-supported portion 27 of the segment 25 at the ends thereof as by screws 47.

Figure 4:
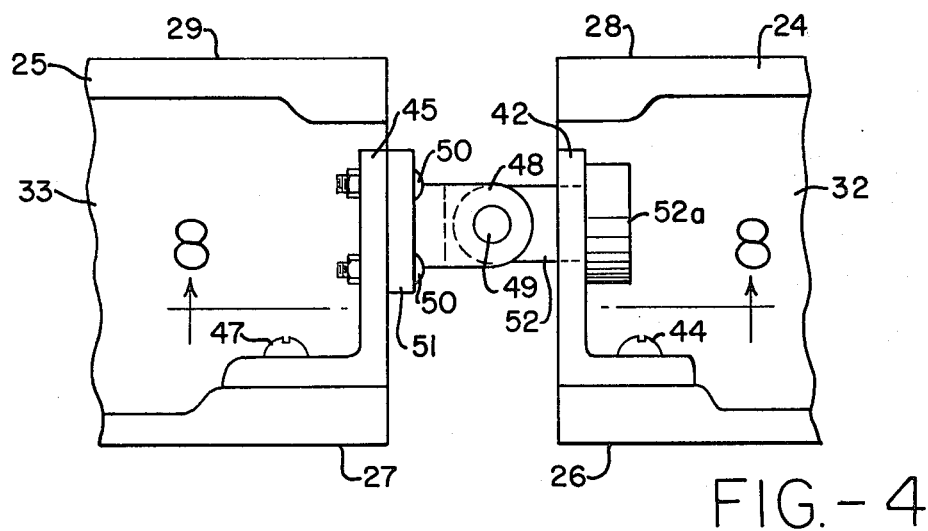
FIG. 4 is an enlarged fragmentary view of the brackets and hinged connection between the segments.

A swivel hinge 48 having a hinge pin 49 with an axis A—A generally parallel to the axis 0 of the annular safety support 10 in the closed position, as shown in FIG. 2, is mounted on the brackets 42 and 45 of the adjoining ends of the segments 24 and 25, as shown in FIGS. 4 and 8. Bolts 50 extend through the base plate 51 of the hinge yoke 48 and through the bracket 45 where they are held in place by nuts threaded on the ends thereof. A rotatable, generally cylindrical hinge member 52 having an axis H—H is mounted in a matching cylindrical hole 42A of the bracket 42 and has a retaining flange 52 for bearing against the surface of the bracket 42.

At the other ends of the segments 24 and 25 is an adjustable latch 53 having a pin member 54 mounted in the bracket 43 and a generally cylindrical socket member 55 mounted in the bracket 46. The pin member 54 is threaded and extends through an opening in the bracket 43. A nut 56 on one side of the bracket 43 and a nut 57 on the other side of the bracket clamp the pin in position in the bracket. A third nut 58 may be threaded on the pin member 54 for locking relationship with the nut 57. At the end of the pin member 54, adjacent the socket member 55, the walls of the member are tapered providing a nose 59 for ease of entry into the socket member 55. A groove 62 adjacent the nose 59 is also provided for reasons to be explained hereinafter.

The socket member 55 extends through an opening 63 in the bracket 46. A flange 64 on the socket member 55 abuts the bracket 46 on one side and a split washer 65 seated in a groove 66 in the outer wall of the cylindrical socket member 55 abuts the other side of the bracket 46 to hold the socket member in position. A bore 67 of the socket member 55 has a diameter substantially the same as the diameter of the pin member 54 and a split washer 68 having a diameter less than the diameter of the pin member is mounted in the bore to snap into the groove 62 of the member when it is inserted in the bore 67 of the socket member, as shown in FIG. 5. The split washer 68 is held in position by a retaining washer 69 which is held by another split washer 70 seated in a groove 71 in the flange 64. The latch 53 is a form of bayonet type lock and it is understood that other forms of latches may be used to perform the function of the latch 53.

Figure 3:
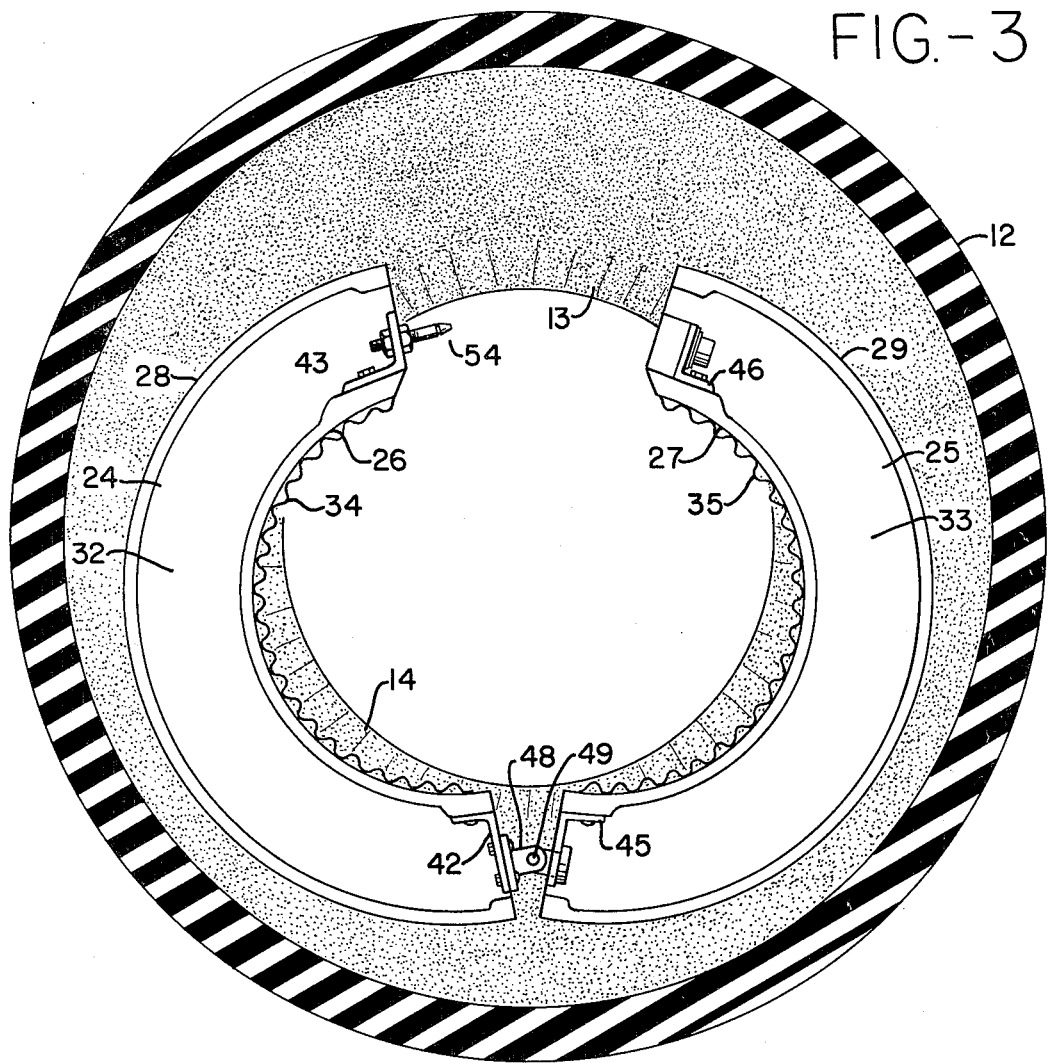
FIG. 3 is an elevation of the safety support in the open position within the tire cavity prior to mounting of the tire and safety support on the rim, with a section of the tire being shown like FIG. 2.

To assemble the safety support 10 in the cavity of the tire 12, the segments 24 and 25 may be swiveled and fed into the cavity between the bead portions 13 and 14 so that the hinged-together segments will rest in the tire cavity in the position shown in FIG. 3. The tire 12 with the safety support 10 is then mounted on the rim 11 by positioning part of the bead portion 14 in the well 19 so that the complete bead portion 14 can be pulled progressively over the flange. During this process, the safety support may also be pulled over the flange 17 in the open condition. Following this, the bead portion 13 may also be pulled progressively over the flange 17 in a similar manner. With the rim 11 of this embodiment, the well has a width W1 greater than the sum of the widths of the bead portions 13 and 14 and the width of the inner rim-supported portion 26 and 27 of the segments 24 and 25 so that both bead portions 13 and 14 may be mounted simultaneously with the safety support 10 in the tire cavity. Projections 72 may be provided in the outer surface of the well 19 for retaining the inner rim-supported portions 26 and 27 between the projections and the edge of the well 19, as shown in FIG. 1. Preferably the projections 72 are spaced from one of the edges of the well 19 a distance substantially the same as the width of the inner rim-supported portions 26 and 27. The width W1 may only need to be as wide as the width of one bead portion 14 and the width of the inner rim-supported portions 26 and 27 because the other bead portion 13 may be inserted over the rim-supported portions during mounting of the tire 12 on the rim 11.

After the tire 12 is mounted on the rim 11 with the hinged segments 24 and 25 therein, the tire is placed between opposing shoes of a hydraulic press which is actuated to push the walls of the tire towards each other and against the segments so that the pin member 54 will enter the bore 67 of the socket member 55. This action will compress the wave springs 34 and 35 and at the same time the pin member 54 will be locked in the bore 67 by split washer 68 springing into the groove 62 of the member.

Through adjusting the nuts 56, 57 and 58 on the pin member 54, the distance between the ends of the segments 24 and 25 at the latch 53 can be predetermined. Accordingly, the compression of the wave springs 34 and 35 may also be predetermined so that sufficient pressure is provided to give preloaded clamping of the segments 24 and 25 on the rim 11. In the present embodiment, the wave spring design and the compression of the wave spring requires a force of 5,000 pounds by the hydraulic press to obtain the compression of the wave springs 34 and 35. The difference between the diameters D1 of the inner rim-supported portions 26 and 27 and the diameter D2 of the wheel well 19 of the rim 11 in the mounted condition is less than twice the amplitude or thickness T of the wave springs 34 and 35 shown in FIG. 7 to provide the preloading. This will insure the compression of the wave springs 34 and 35 to provide the preloaded clamping.

Where it is desirable to increase or decrease the clearance between the segments 24 and 25 and the rim 11 in the mounted condition of the safety support 10, the nuts 56, 57 and 58 can be loosened. The pin member 54 may then be moved toward or away from the bracket 43 to decrease the distance between the ends of the segments 24 and 25. The nuts 56, 57 and 58 may then be tightened to lock the pin member 54 in place.

When it is desirable to remove the tire 12, air can be released through valve 23 and a part of the bead portion 13 moved into the well 19 so that the complete bead portion 13 can be removed and be pulled progressively over the flange 17. This portion is then pulled away from the flange providing access to the latch 53. A wrench can then be inserted inside the cavity and nut 58 released so that nut 57 may be threaded off the pin member 54 and the pin member pulled out of the bracket 43. The safety support 10 then may be opened to the position shown in FIG. 3 so that it may be pulled over the flange 17 and bead portion 14 may be removed from the tire through the well 19. The segments 24 and 25 may then be pulled out of the tire cavity with the segments swiveling around axes A—A and H—H. The pin member 54 may be removed from the bore 67 by removing split washer 70 from the groove 71 which will release the washer 69. The pin 54 may then be removed from the bore 67 and the split washer 68 pulled out of the groove 62.

In the embodiment shown, the wave springs 34 and 35 are shown interposed between the safety support 10 and the rim 11; however, it is understood that other resilient members may be used as for instance a band of resilient rubberlike material having openings into which the rubber may move upon compression.

With the construction of this invention, rapid mounting of the tire 12 and safety support 10 on the rim 11 is possible. After the tire is mounted on the rim which may require inflation of the tire to seat the beads and then deflation, the segments 24 and 25 may be pushed together by a hydraulic press and the ends latched together at a predetermined position utilizing the latch 53. Removal of the safety support 10 and tire 12 is also facilitated and the safety support may be utilized again. When the tire 12 is operated in the deflated condition, it will be supported by the safety support 10 and torque transmitted from the tire tread-supporting portions 28 and 29 through the curved intermediate portions 32 and 33 to the inner rim-supported portions 26 and 27. The torque is then transmitted through the wave springs 34 and 35 to the outer surface of the wheel well 19. The preloaded clamping of the safety support 10 on the rim 11 prevents the relative rotation of the safety support on the rim and therefore protects the safety support from damage or destruction due to the heat generated by relative rotation or the impacts which would occur in a construction where the safety support is not clamped in a preloaded manner.

While a certain representative embodiment and details have been shown for the purpose of illustrating the invention, it will be apparent to those skilled in the art that various changes and modifications may be made therein without departing from the invention.

What is claimed is:

1. A safety support for use on a wheel rim for a pneumatic tire comprising an annular body having an inner rim-supported portion at the inner periphery and a tire tread-supporting portion at the outer periphery, said annular body being separated into arcuate generally semicircular first and second segments with adjoining ends in the mounted condition, swivel hinge means fastened to one of said adjoining ends of said first and second segments, said swivel hinge means having a hinge pin with an axis generally parallel to the axis of said annular body and a swivel member rotatable about a third axis for swivel action of said segments during insertion and removal of said segments from the pneumatic tire, latch means fastened to the other of said adjoining ends of said first and second segments and a separate elongated resilient member of resilient material extending circumferentially along a portion of said inner rim-supported portion of at least one of said segments for preloaded compression resulting in reduced thickness of said resilient member between said annular body and said rim when said other of said adjoining ends is connected by said latch means during mounting of said support on said wheel rim by swinging movement of said first and second segments together about said hinge pin.

2. A safety support according to claim 1 wherein said resilient means includes a second separate resilient member and said first-mentioned resilient member and said second resilient member extending circumferentially along said inner rim-supported portion of said first and second segments.

3. A safety support according to claim 1 wherein said elongated resilient member has spaced-apart portions providing openings therebetween to facilitate compression thereof to provide the desired preloaded clamping force of said safety support on said wheel rim.

4. A safety support according to claim 3 wherein said elongated resilient means includes a wave spring of steel fastened to said inner rim-supported portion.

5. A safety support according to claim 1 wherein said annular body has a C-shaped cross section with an inner surface on said inner rim-supported portion, a tire supporting surface on said tire tread-supporting portion and a curved intermediate portion joining said rim-supported portion and said tire tread-supporting portion, bracket means mounted on said inner rim-supported portion of said adjoining ends of said first and second segments and said latch means and said hinge means being mounted on said bracket means.

6. A safety support according to claim 5 wherein said latch means comprises a socket member and pin means mounted on said bracket means, said pin means being removably mounted on said bracket means for axial adjustment of said pin means to connect said first and second segments at more than one predetermined spacing to provide different amounts of preloaded clamping force on said wheel rim and for disconnecting the segments to remove the safety support from the rim.

* * * * *